(12) United States Patent
Frandzel et al.

(10) Patent No.: US 8,131,924 B1
(45) Date of Patent: Mar. 6, 2012

(54) DE-DUPLICATION OF DATA STORED ON TAPE MEDIA

(75) Inventors: Yuval Frandzel, Foster City, CA (US); Andrew Narver, Menlo Park, CA (US); Ajay Singh, San Francisco, CA (US); Joseph White, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 667 days.

(21) Appl. No.: 12/051,044

(22) Filed: Mar. 19, 2008

(51) Int. Cl.
*G06F 3/06* (2006.01)
*G06F 13/00* (2006.01)
*G06F 13/28* (2006.01)

(52) U.S. Cl. ............ 711/113; 711/4; 711/111; 711/154; 711/118; 711/117; 711/165; 711/133; 711/E12.069

(58) Field of Classification Search ........................ None
See application file for complete search history.

(56) References Cited

U.S. PATENT DOCUMENTS

| | | | |
|---|---|---|---|
| 5,802,599 A | 9/1998 | Cabrera | |
| 5,990,810 A | 11/1999 | Williams | |
| 7,289,643 B2 | 10/2007 | Brunk et al. | |
| 2004/0148306 A1 | 7/2004 | Moulton et al. | |
| 2005/0071436 A1 | 3/2005 | Hsu et al. | |
| 2007/0208788 A1* | 9/2007 | Chakravarty et al. | 707/204 |
| 2007/0255758 A1 | 11/2007 | Zheng et al. | |
| 2008/0294696 A1 | 11/2008 | Frandzel et al. | |
| 2009/0171888 A1* | 7/2009 | Anglin | 707/2 |

OTHER PUBLICATIONS

Bilenko, M., et al., "Adaptive Duplicate Detection Using Learnable String Similarity Measures". Published in Proceedings of the Ninth ACM SIGKDD International Conference on Knowledge, Aug. 23, 2003, pp. 1-10.

Crochemore, M. et al., "Pattern Matching and Text Compression Algorithms", dated Jan. 8, 2003, retrieved from http://citeseer.comp.nus.edu.sg/595025.html, 50 pages.

Kulkarni, P., et al., "Redundancy Elimination Within Large Collections of Files", Proceedings of the 2004 USENIX Annual Technical Conference, Boston, MA, Jun. 2004, 15 pages.

Network Appliance, Inc., PCT Notification of Transmittal of The International Search Report and the Written Opinion of the International Searching Authority, or the Declaration, International Application No. PCT/ US2007/010222, International Filing Date: Apr. 26, 2007; Date of Document Mailing: Apr. 15, 2008, 15 pages.

(Continued)

*Primary Examiner* — Reginald Bragdon
*Assistant Examiner* — Eric S Cardwell
(74) *Attorney, Agent, or Firm* — Cesari and McKenna, LLP

(57) ABSTRACT

Embodiments of the present invention provide mechanisms for improving storage consumption on a sequential access medium, such as a physical tape, by preferably storing one instance of a data block of a backup data set on the tape media. When another instance of a data block is received having the same pattern as the stored data block, rather than storing the data block itself, a reference to the data block is stored on the sequential access medium. When data are restored, data blocks are cached at a block store on a storage device(s) having a faster seek time than the tape. When a reference to a previously stored data block is read from the tape, rather than re-winding the tape to search for the data block on the tape (which might take a long time to locate), the referenced data block can be found on the storage device having a faster seek time than the tape media.

24 Claims, 11 Drawing Sheets

OTHER PUBLICATIONS

Network Appliance, Inc., PCT Notification of Transmittal of the International Search Report and the Written Opinion of the International Searching Authority, or the Declaration, International Application No. PCT/US2008/006536, International Filing Date: May 22, 2008; Date of Document Mailing: Sep. 29, 2008, 13 pages.

Patterson, D., et al., "A Case for Redundant Arrays of Inexpensive Disks (RAID)", SIGMOD International Conference on Management of Data, Chicago, IL, USA, Jun. 1-3, 1988, SIGMOD Record (17):3: pp. 109-116 (Sep. 1988).

Quinlan, S., et al., "Venti: A New Approach to Archival Storage", Proceedings of the Conference on File and Storage Technologies, USENIX Association, Berkeley, CA, Jan. 28, 2002, 14 pages.

Reichenberger, C., "Delta Storage for Arbitrary Non-Text Files", Software Configuration Management Workshop, Proceedings of the $3^{rd}$ International Workshop on Software Configuration Management, Trondheim, Norway, Jun. 12-14, 1991, ACM Press, pp. 144-152.

Zheng, et al., U.S. Appl. No. 11/105,895, filed Apr. 13, 2005, entitled Method and Apparatus for Identifying and Eliminating Duplicate Data Blocks and Sharing Data Blocks in a Storage System, 46 pages.

Hernandez, M. A., et al., "Real-world Data is Dirty: Data Cleansing and the Merge/Purge Problem". Published in Data Mining and Knowledge Discovery,Jan. 1998, vol. 2, pp. 1-32 (48 pages).

Lee, et al. "IntelliClean: a Knowledge-based Intelligent Data Cleaner", published by ACM International Conference on Knowledge Discovery and Data Mining, 2000, pp. 290-294.

* cited by examiner

US 8,131,924 B1

DE-DUPLICATION OF DATA STORED ON TAPE MEDIA

RELATED APPLICATION

This application is related to commonly-owned patent application Ser. No. 11/414,600, entitled "System and Method for Sampling Based Elimination Of Duplicate Data," by Ling Zheng, et al, filed on Apr. 28, 2006 and Ser. No. 11/691,956 entitled "System and Method for On-the-Fly Elimination of Redundant Data", by Yuval Frandzel, et al., filed on May 22, 2007.

FIELD OF THE INVENTION

The present invention relates generally to data storage compression, and more specifically, to reducing storage of duplicate data on tape media.

BACKGROUND

Data storage is a central part of many industries that operate in archival and compliance application environments, such as banks, government facilities/contractors and securities brokerages. In many of these environments, selected data, such as electronic-mail messages, financial documents and/or transaction records are stored for long periods of time. One form of long-term archival storage is storage of data on electronic tape media. Storing data on tape media can be done manually or, with appropriate software, can be done automatically. Storing data on tape media, however, often results in storing redundant or duplicate data, thereby causing inefficient consumption of storage space on the tape media. One of the mechanisms to improve storage consumption is to compress data prior to storing it on the tape. Data may be compressed using, e.g., the LZW compression algorithm, or other suitable compression algorithms. Although using compression algorithms can result in 2:1 space savings, still, data in the compressed form occupies a significant amount of storage space.

Tape media, being a sequential access medium, can be contrasted with a random access medium (such as disks). When data are written to or read from a hard disk drive, the hard disk drive can move its read/write heads to any random part of the disk platters in a very short period of time. In contrast, a tape drive typically spends a considerable amount of time winding the tape to read the requested data. As a result, tape drives typically have slow average seek times (e.g., time to find requested data on a storage medium). Because of the sequential access properties of physical tapes (and thus inherent slow seek time) and their huge capacity, tape libraries are primarily used as the final stage of data archiving.

Therefore, it is desirable to provide a mechanism that improves storage consumption on the storage resources, such as physical tapes.

SUMMARY OF THE INVENTION

Embodiments of the present invention provide mechanisms for improving storage consumption on a sequential access medium, such as a physical tape, by preferably storing one instance of a data block of a backup data set (e.g., data to be backed up for long term storage) on the tape media. When another instance of a data block is received (which has the same pattern as the stored data block), rather than storing this subsequent data block itself, a reference to the data block, which has a smaller size than the data block, is stored on the sequential access medium. Storing a reference to the data block on the sequential access medium results in improved storage consumption. When data are restored from the sequential access media, data blocks are cached on a storage device(s) having a faster seek time than the sequential access medium. When a reference to a previously stored data block is read from the tape, rather than re-winding the tape to search for the data block on the tape (which might take a long time to locate given sequential access of the tape media), the referenced data block can be found on the storage device having a faster seek time than the sequential access media. As a result, the requested data are provided to the requestor of data in a timely fashion. As used herein, "seek time" refers to the time to find data on a medium. Thus, while recognizing challenges (e.g., slow access time) associated with storing data to and recovering data from the sequential access medium, novel mechanisms described herein overcome these difficulties and provide a mechanism for preferably storing one instance of data on the sequential access media.

Furthermore, the present invention advantageously not only saves space consumption on the tape media, but also provides efficient space use of the random access media (such as disk). For example, embodiments described herein do not store mappings between a reference to a data block and a data block itself. Importantly, data can be re-duplicated in the block store without rewinding the sequential media. In addition, embodiments described herein provide computational savings by implementing a read ahead mechanism so that data blocks can be read from the tape in anticipation of the client request.

According to embodiments described herein, when a new data set (e.g., a backup data stream) is received by a server (e.g., a storage system or a virtual tape library (VTL) system implementing the invention) from a client system, one or more anchors are identified within a new data set to break the data set into a number of smaller chunks of data. As used herein, an anchor is defined as a point within the data set that defines a region of interest for potential data de-duplication (e.g, reducing storage of redundant data). For each anchor identified in the new data set, a fingerprint of data blocks between anchors can be generated. As used herein, a fingerprint refers to a value generated by applying a function (such as a hash function) on a data block. A "data block", as the term is used herein, is a contiguous set of data, typically, of a known length starting at a particular offset value. In certain embodiments of the invention, blocks contain 4 Kbytes of data and/or metadata (which provides information about the data). In other embodiments, data blocks can be of a different size. A determination is made if the data block has already been stored on a tape by, for example, consulting a fingerprint data structure. If the fingerprint is not found in the data structure, it indicates that the data block has not been previously stored on the tape. The data block is then stored on the tape and the fingerprint data structure is updated with the fingerprint of the newly stored block. If the fingerprint is found in the data structure, it indicates that the data block has been previously stored on the tape. The server (such as a storage system or VTL) performs de-duplication of the backup data by writing to the tape a reference to the data block that has already been stored on the tape rather than writing the data block itself. As used herein, "back-referenced" data refers to data that have previously been stored on tape media and to which a back reference points.

When restoring data from the tape, data blocks are first written to a storage device (such as a disk) having a seek time faster than that of tape media. When a back reference is encountered, the referenced data block is found on the disk rather than being searched on the tape. Then requested data are provided to a requestor (e.g., a client system). As a result, tape de-duplication becomes transparent to the requestor of the data. Without the use of the disks, the sequential access media would have to be re-wound to find referenced data. Such a process would take a long time to complete.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION OF THE INVENTION

1. System Environment

Figure 1A:
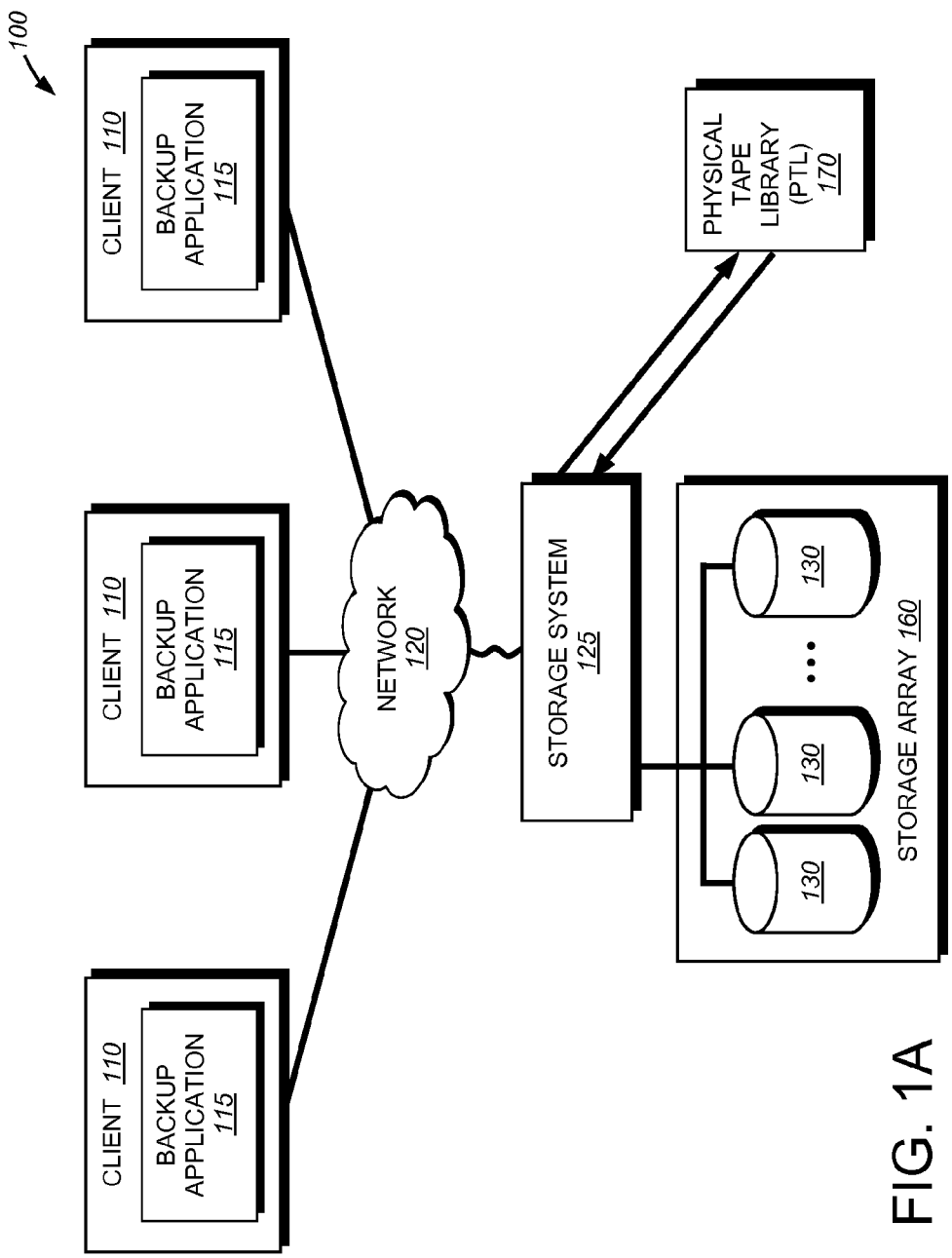
FIG. 1A is a schematic block diagram of storage environment according to one embodiment of the present invention.

FIG. 1A is a schematic block diagram of storage system environment 100 that may be used with the present invention. The storage system environment 100 comprises one or more storage systems 125 interconnected with a plurality of clients 110 via network 120. For ease of description, only one storage system is shown in FIG. 1A. The environment 100 further includes a physical tape library (PTL) 170 to which client 110 sends data for long-term storage.

Storage system 125 is connected to one or more storage devices onto which data may be stored, and from which data may be obtained, as desired. The storage system 125 may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term "disk" in this context is synonymous with hard disk drive (HDD) or direct access storage device (DASD).

In operation, the storage system 125 services data access requests from the client system (client) 110. Each client 110 may be a general-purpose computer configured to execute applications and interact with the storage system 125 in accordance with a client/server model of data delivery. That is, the client 110 may request the services of the storage system 125, and the storage system may return the results of the services requested by the client by exchanging packets over the network 120. The clients 110 may issue packets including file-based access protocols, such as the Common Internet File System (CIFS) protocol or Network File System (NFS) protocol, over TCP/IP when accessing data in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing data in the form of data containers, such as blocks.

According to architecture shown in FIG. 1A, clients 110 execute a backup application 115 (such as a tape backup application). Backup application is designed to issue requests to backup data to the tape for the purpose of having a backup copy of original data in the event of loss or damage to data stored on a primary storage, such as client 110. Typically, backup application 115 can be used to send a request (in the form of a sequence of commands) to backup data to storage system 125 (or VTL system 200 shown in FIG. 1B). A backup application can be, for example, Legato® provided by EMC Corporation of Hopkinton, Mass., Veritas™, provided by Symantec Corporation of Cupertino, Calif., as well as any other known tape backup application. Illustratively, the network 120 may be embodied as an Ethernet network or a Fibre Channel (FC) network.

PTL 170 is a storage device, which contains one or more tape drives, a number of slots to hold tape cartridges, a barcode reader to identify tape cartridges and an automated method for loading tapes (a robotic arm). These known components of the PTL are not shown in FIG. 1A. Barcode labels are typically used with physical tapes to facilitate automated tape handling and tracking by the backup application, such as backup application 115. Thus, the backup application keeps track of data that is stored on tape by associating the data with a tape having a particular barcode. The physical tapes typically also have a human-readable version of the data coded to provide for identification of the physical tapes. The barcode reader is used to read the barcode labels on the physical tapes and identify the tapes. As used herein, the terms "tape", "physical tape", and "tape media" are used interchangeably.

PTL 170 preferably includes an entry/exit port, which provides a pathway for tapes to be automatically moved into and out of the PTL. A tape in the entry/exit port can be accessed by a human operator while the rest of the tapes are secured within the physical library housing. Robotic mechanisms are used to move a tape between a slot and the entry/exit port.

When data are written to or read from a hard disk drive, the hard disk drive can move its read/write heads to any random part of the disk platters in a very short period of time. In contrast, a tape drive typically spends a considerable amount of time winding the tape to read the requested data. As a result, tape drives typically have slow average seek times (e.g., time to find requested data on a storage medium). Because of the sequential access properties of physical tapes (and thus inherent slow seek time) and their huge capacity, tape libraries are primarily used as the final stage of data archiving.

Figure 1B:
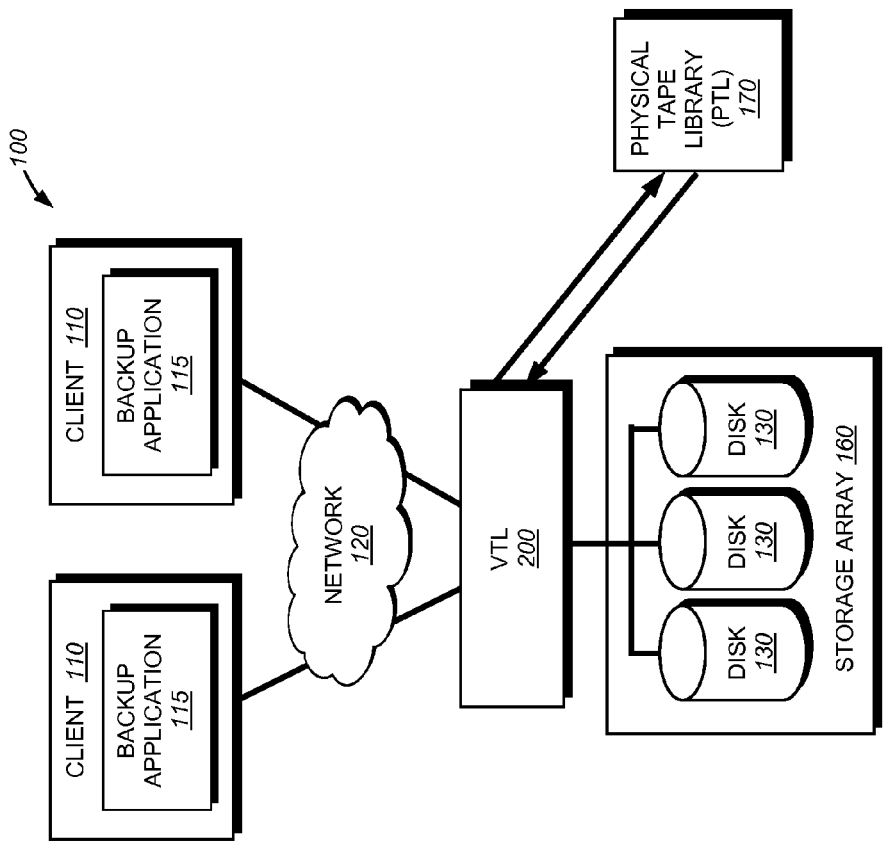
FIG. 1B is schematic block diagram of storage environment according to another embodiment of the present invention.

Backup application 115 typically sends write requests (or copy of data request) to storage system 125 (or to virtual tape library (VTL) 200 shown in FIG. 1B). For example, a client write request may contain a 128 KB data block (e.g., backup data set). At storage system 125, such a data block may be broken into some number of smaller (e.g., 4 KB) blocks on which de-duplication is performed by storage system 125 (as will be described in greater detail below). Once the data has been processed by storage system 125, storage system 125, in turn, issues I/O requests to the PTL 170 to store the data at PTL 170. Storage system 125 communicates with PTL using, for example, low-level commands, such as serial Small Computer Systems Interface (SCSI) commands or Fibre Channel (FC) network commands, or FCoP. The commands can also be sent using IP-based protocols, such as iFCP, iSCSI, etc.

The commands may include instructions for storing data at the PTL as well as the data itself. Therefore, a command may require movement of components of a PTL as well the actual writing of data. A typical instruction may provide:

a) fetch tape 1 from slot 5;
b) put tape 1 in tape drive 1;
c) copy data to location Z of tape 1.
In response to such a command, a PTL would
d) move its robotic mechanism to slot 5;
e) access tape 1;
f) move robotic arm to tape drive 1;
g) release tape
h) forward to location Z of tape 1 and
i) copy data.

As described herein, storing backup data at PTL 170 results in storing significant amount of duplicated data, i.e., data that remains common among each of the backups and/or redundant data between backups of different clients 110. According to embodiments described herein, data are de-duplicated prior to being stored on tape media (e.g., only one instance of data is stored on tape media). Instead of storing duplicate data blocks on the tape, a reference to previously stored data blocks are written to the tape (appreciably, the reference has a smaller size than the data block itself). Furthermore, as will be described in more detail herein, when data are restored from the tape media in response to a client request, the data are first cached on a storage device(s) having a faster seek time than the tape media. When a reference to a previously stored data block is read from the tape, instead of searching the referenced data on the tape (which can be stored at a distant location on the tape and thus might take long time to locate given slow seek time of the tape media), the referenced data (data to which the reference refers) are found on the storage device having a faster seek time than the tape media. As a result, the requested data are provided to the client in a timely fashion.

FIG. 1B is a block diagram of an alternative embodiment of environment for de-duplicating data prior to storing it to tape media. Environment includes clients 110 connected to a virtual tape library (VTL) system 200 over network 120. Also, connected to the VTL system 200 are one or more storage devices, such as disks 130 organized as a storage array 160. The VTL system 200 is also connected to the physical tape library (PTL) 170.

Clients 110 execute backup application 110, which issues commands to VTL 200 to backup data stored at the client 110. The VTL 200 is used as an intermediary between the PTL for performance reasons since data can be written to disks must faster than it could be written to the PTL. Streaming data first to the disks (connected to the VTL) results in a smaller backup time window from the client system's prospective and allows the client system to go back to handle user requests instead of engaging in a rather long process of backing up data directly to PTL 170. Backup application 115 keeps track of data that is backed up on tape by associating the data with a tape having a particular barcode. By including a barcode reader, the PTL can identify a particular physical tape.

VTL 200 is a disk-based repository for storing backup data sent by the client 110. The VTL is a logical representation of a PTL. By means of emulation, the VTL 200 exhibits all the behaviors of a PTL—it appears to have a robotic arm, one or more tape drives, tape cartridge slots, mailbox (entry/exit) slots and a bar code reader. One or more of each of these devices are emulated in such a way that they can respond on a bus, small computer system interface (SCSI) or fibre channel (FC), in exactly the same way as PTLs do. The VTL makes it possible to save data as if it were being stored on a tape although it is actually stored on disk or another storage medium. As is known in the art, VTL appears as tape libraries to client 110, but has the advantage of providing performance of disk drives. Data are written directly to disk drives in the same format as it would be written onto a physical tape. By way of example, if a command sent by the backup application 115 indicates that the data should be copied to physical tape 1 at location Y of PTL 170, the data will be copied to a particular location on disks connected to the VTL that logically corresponds to physical tape 1, location Y, of PTL 170.

The VTL 200 then sends the backup data to PTL 170 using low-level commands, such as serial Small Computer Systems Interface (SCSI) commands or Fibre Channel (FC) network commands. The commands can also be sent using IP-based protocols, such as iFCP, iSCSI, etc.

The VTL system 200 illustratively implements the data de-duplication technique of the present invention. More, specifically, de-duplication module 290 at the VTL system 200 performs de-duplication of the data prior to storing data on a physical tape so that only one instance of data are stored on the tape and a reference to previously stored data are written to the tape. Furthermore, when the data are recovered from the PTL, data blocks are first cached to the disks connected to the VTL and then copied prior to being provided to the requestor (such as client 110). When a back reference to previously stored data is read from the tape, back-referenced data are found on disk and provided to the requestor in a timely fashion given a faster seek time of the disk medium.

In yet another implementation (not shown in FIGS. 1A and 1B), storage system 125 can be connected to VTL system 200. In this implementation, storage system 125 executes a backup application, which issues write requests to write data to VTL.

Figure 2A:
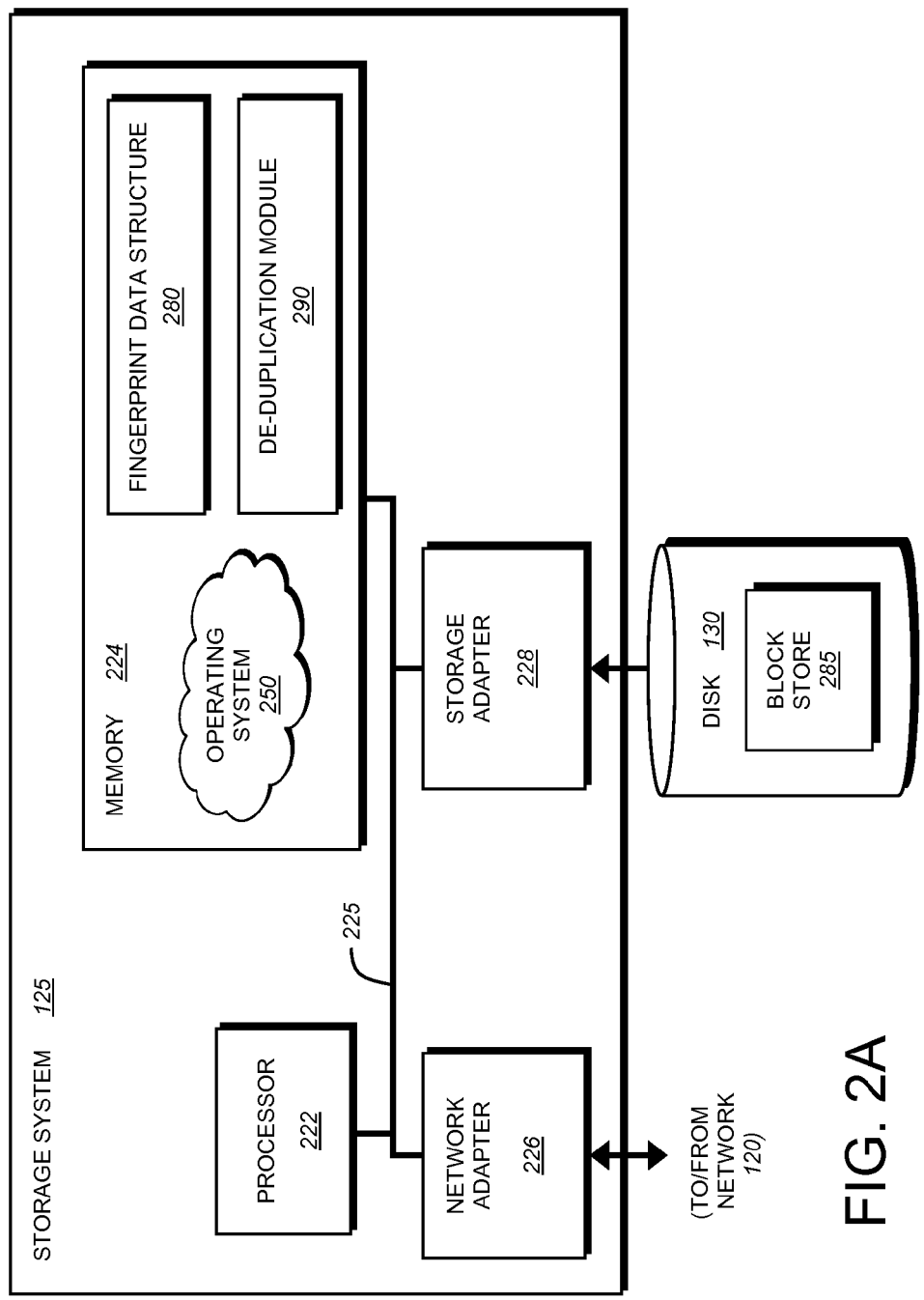
FIG. 2A is a schematic block diagram of components resident on a storage system shown in FIG. 1A in accordance with an embodiment of the present invention.

Referring now to FIG. 2A, it illustrates various components of storage system 125 shown in FIG. 1A. Storage system 125 is a device that provides storage service relating to the organization of data on storage devices, such as disks 130 of array 160. Although only one disk 130 is shown on FIG. 2A, those skilled in the art would understand that storage system 125 connects to more than one storage device. Storage system 125 illustratively comprises a processor 222, a memory 224, one or more network adapters 226 and one or more storage adapters 228 interconnected by a system bus 225. Each network adapter 226 comprises the mechanical, electrical and signaling circuitry needed to connect the storage system 125 to clients 110 over the network 120. Storage system 125 also includes an operating system 250 that interacts with various modules. The operating system 250 may implement a block store 285 on disks 130 for caching data blocks read from the tape.

The processor and adapters may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the inventive technique described herein.

The storage adapter 228 cooperates with the operating system 250 executing on storage system 125 to store and retrieve data requested on any type of attached array of writable storage device media such as video tape, optical, DVD, magnetic tape, bubble memory, electronic random access memory, micro-electro mechanical and any other similar media adapted to store data and parity. However, as illustratively described herein, the data is preferably stored on the disks 130, such as HDD and/or DASD, of local storage array 160. The storage adapter includes input/output (I/O) interface circuitry that couples to the disks over an I/O interconnect arrangement, such as a conventional high-performance, FC serial link topology.

In the illustrative embodiment, the memory 224 comprises storage locations that are addressable by the processor and adapters for storing software program code, such as operating system 250 and de-duplication module 290. De-duplication module 290 of storage system 125 identifies one or more anchors within the received data set to parse the data set into a number of smaller chunks of data on which de-duplication is performed. The de-duplication module 290 generates a block store 285 that is utilized to cache data blocks read from the tape. As will be described in more detail herein, the block store 285 can be a staging area where data are temporarily stored when read from the physical tape. In addition, the block store 285 is a place where data is re-duplicated (e.g., data blocks referenced by back references are found prior to being provided to a requestor, such as a client). Furthermore, the block store 285 is used to store data read by the server even prior to receiving a request from the backup application.

De-duplication module 290 is further configured to identify in the backup data set, data blocks previously stored on tape by implementing various algorithms described herein. For example, de-duplication module 290 generates a fingerprint data structure 280 (shown in FIG. 6) that is utilized for storing fingerprints of data blocks. Fingerprint data structure 280 can be stored in memory 224 and implemented as a hash table. A "fingerprint" as used herein is a value generated by applying a function on a data block for purposes of determining whether two data blocks are the same. According to yet another implementation, fingerprint data structure 280 can be stored on disks rather than in memory.

Figure 2B:
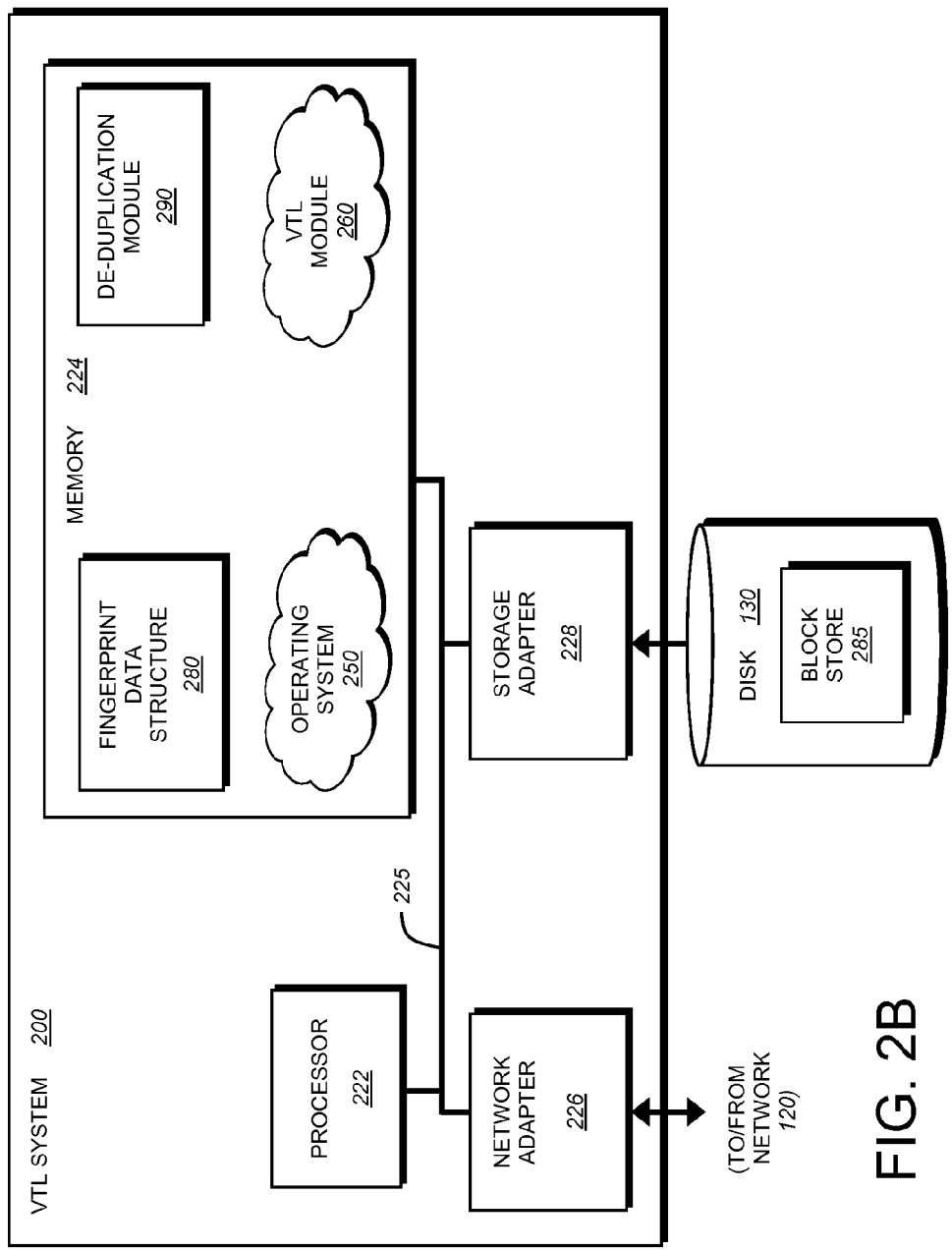
FIG. 2B is a schematic block diagram of components resident on a VTL system shown in FIG. 1B in accordance with an embodiment of the present invention.

FIG. 2B is a schematic block diagram of a VTL system 200 that may be advantageously used with the present invention. Illustratively, the VTL system 200 is a disk-based repository for storing backup data sent by the client 110. VTL system is a logical representation of PTL such that it appears to the client as a tape library. VTL has the advantage of providing performance of disk drives. Data are written to disk drives in the same format as it would be written to the physical tape.

The VTL system 200 illustratively comprises a processor 222, a memory 224, one or more network adapters 226 and one or more storage adapters 228 interconnected by a system bus 225. Each network adapter 226 comprises the mechanical, electrical and signaling circuitry needed to connect the VTL system 200 to clients 110 over the network 120. The VTL system 200 also includes an operating system 250 that interacts with various modules, such as virtual tape library (VTL) module 260. VTL module 260 cooperates with the operating system 250 to implement virtual tape library functionality for the VTL system 200. Notably, the VTL module 260 communicates with PTL 170 to send data to PTL for storage. VTL system 200 executes/maintains other modules and data structures similar to the ones maintained by the storage system 125. For example, VTL system 200 executes a de-duplication module 290. VTL system 200 implements a block store 285 on disks for caching data read from the tape media. Furthermore, VTL system maintains fingerprint data structure 280 for storing fingerprints.

In the illustrative embodiment, the memory 224 comprises storage locations that are addressable by the processor and adapters for storing software program code, such as operating system 250 and VTL module 260. The processor and adapters may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the inventive technique described herein.

The storage adapter 228 cooperates with the operating system 250 executing on the VTL system 200 to store and retrieve data requested on any type of attached array of writable storage device media adapted to store data and parity. As illustratively described herein, the data is preferably stored on the disks 130, such as HDD and/or DASD, of local storage array 160. As described herein, data are written to disk in the same format as it would be written to a physical tape. The storage adapter 228 includes input/output (I/O) interface circuitry that couples to the disks over an I/O interconnect arrangement, such as a conventional high-performance, FC serial link topology.

As described herein, the VTL module 260 is configured to issue commands to store data at PTL 170. These commands are typically low-level commands, such as serial SCSI commands or FC network commands. The commands can also be sent using IP-based protocols, such as iFCP, iSCSI, etc. The commands may include instructions for copying data to the PTL as well as the data itself. Therefore, a command may require movement of components of a PTL as well the actual writing of data.

Methods of Operation

A. Write Operation

Figure 3:
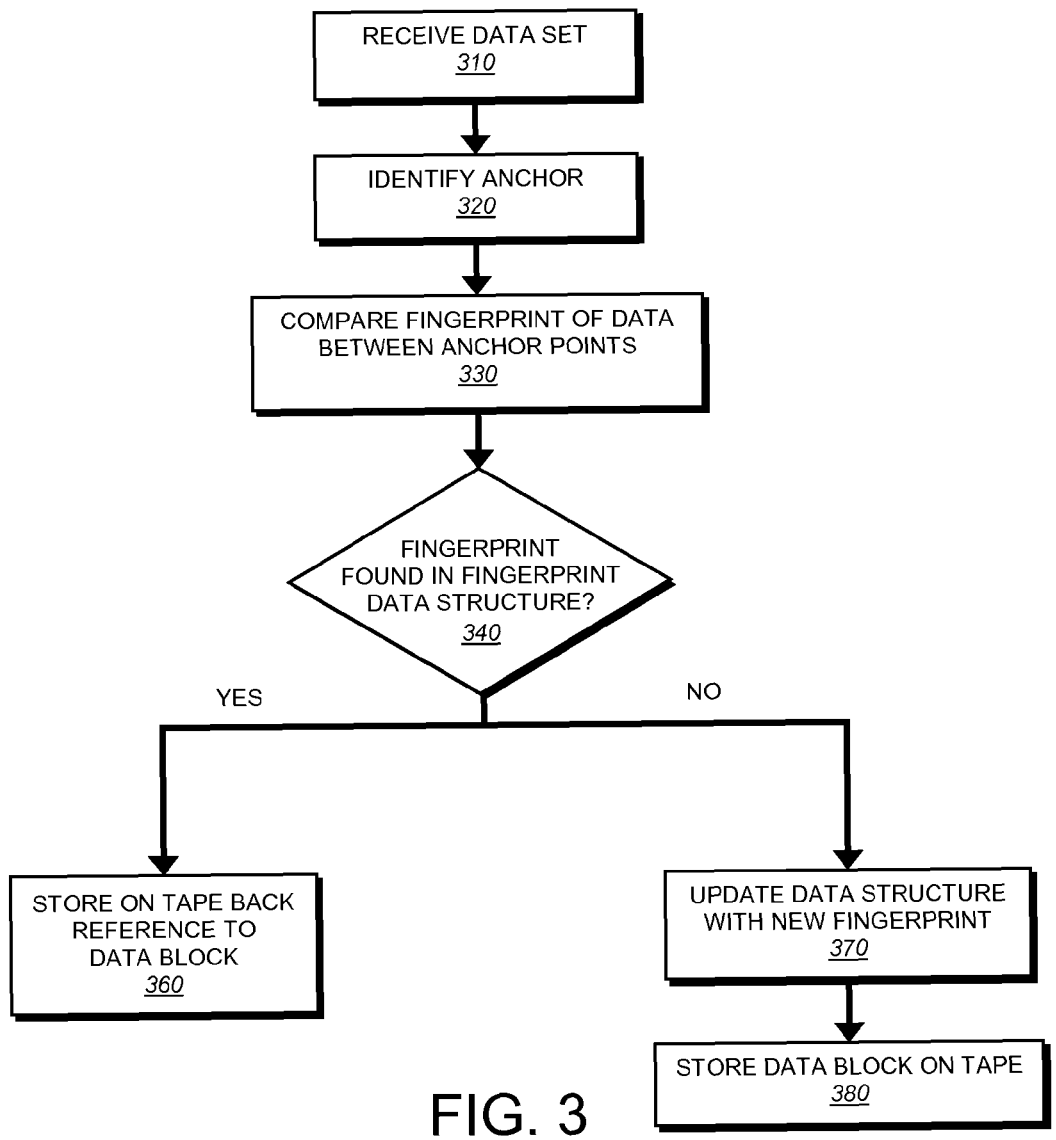
FIG. 3 is a flow diagram showing the steps to write de-duplicated data on tape media according to one embodiment of the present invention.

Referring now to FIG. 3, it illustrates steps performed by storage system 125 (or VTL system 200) to reduce amount of duplicate data written to tape media according to one embodiment of the present invention. At step 310, a new tape backup data set is received by storage system 125 and is stored in memory (e.g., memory 224). As described herein, the backup data set may contain a 128 KB data block. De-duplication module 290 of storage system 125 identifies one or more anchors within the received data set parse the data set into a number of smaller chunks of data on which de-duplication is performed. An anchor can be a point within the data set that defines a region of interest for potential data de-duplication. Anchors may be identified in a plurality of ways. For example, anchors may be located by performing a rolling hash of the data set. As known in the art, a rolling hash is a hash function where the input is hashed in a fixed width window that moves through the input. Anchors may also be selected based on location within a data container, e.g., a file, at predefined offsets within the data set. De-duplication module 290 generates the fingerprint data structure 280 (shown in FIG. 6) that is utilized for comparing fingerprints of data blocks for purposes of determining whether a particular data block has already been stored on the tape media.

Once anchors have been identified at step 320, de-duplication module 290 generates a fingerprint of data between identified anchors (step 330). In one implementation, a fingerprint can be generated using a Rabin-Karp hash function or using any other deterministic technique to generate a value. A fingerprint may comprise a hash value of the block. Using a hash function may allow de-duplication module 290 to reduce collision between data blocks (i.e., having data blocks with identical fingerprints).

Figure 6:
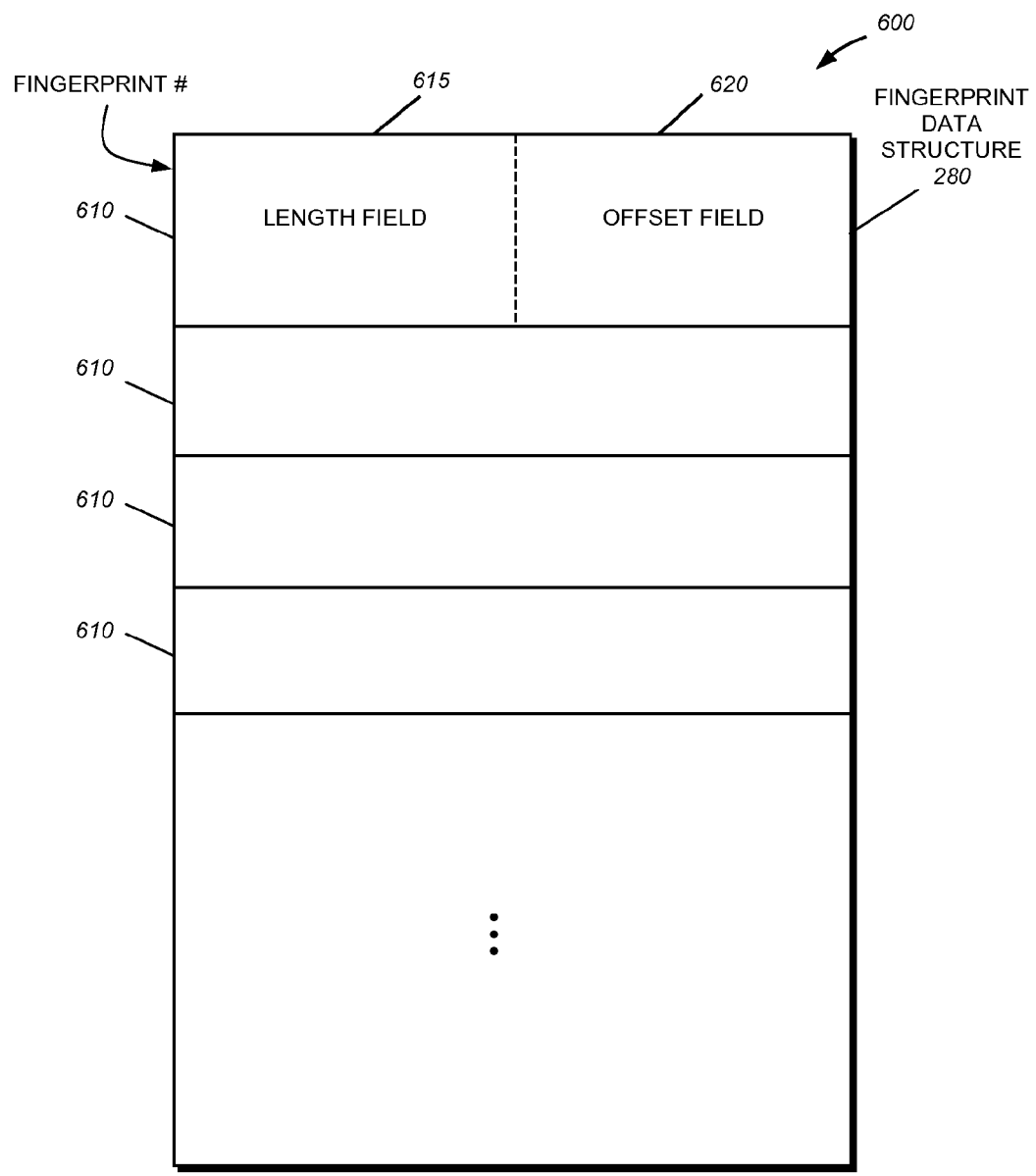
FIG. 6 is a block diagram of a fingerprint data structure for storing fingerprints of data blocks.

After a fingerprint of a data block has been computed, de-duplication module 290 determines (at step 340) whether a data block having the same fingerprint has been previously stored on tape. To this end, in one implementation, de-duplication module 290 examines the contents of a fingerprint data structure 280, such as the one shown in FIG. 6. Those skilled in the art would understand that generating fingerprints and using a fingerprint data structure is one example of determining whether a data block has been stored on the tape, and that other techniques can be used to accomplish the same result. The fingerprint data structure 280 includes a plurality of entries 610 as shown in FIG. 6. Entry 610 is indexed by a fingerprint number and is associated with a particular data block stored on a tape media. In one implementation, an entry includes a length field 615 and offset field 620. The length field identifies the length of the block stored on the tape. The offset field identifies the offset of the data block on tape. It should be noted that entire contents of the tape can represent a byte data stream and an offset within the tape is an integer indicating the distance (displacement) from the beginning of the tape until a given point in the data stream.

Those skilled in the art would understand though that information other than length and offset of the data block on tape media can be stored in fingerprint data structure 280.

If a fingerprint of the data block does not appear in the fingerprint data structure, it indicates that the data block has not been previously stored on a tape. The fingerprint data structure 280 is then updated with the fingerprint of the data block (step 370). De-duplication module 290 sends a command to PTL 170 to store the data block along with a header indicating that it is a data block (step 380). In an alternative embodiment, the data block may be compressed using, e.g., the LZW compression algorithm, or other suitable compression algorithms. Advantageously, the fingerprint data structure 280 does not store mappings between data blocks and their back references.

If a fingerprint of the data block is found in the fingerprint data structure, it indicates that the data block has previously been stored on a tape. According to embodiments described herein, rather than storing the data block on the tape, a back reference to the data block will be written to the tape (step 360). In one implementation, a back reference can be a combination of a length of a data block and its offset on the tape. Those skilled in the art would understand that a back reference can be created using other techniques. Appreciably, a back reference is of a smaller size than the data block it references. De-duplication module 290 sends a command to PTL 170 to store the back reference and a header indicating whether the stored data is a data block or a back reference. As a result, if there are two occurrences of the same data block in a data set, only one occurrence of a data block is stored on the tape, thereby improving total storage consumption on the tape. The resulting data set, which includes data blocks and references to data blocks, is written to PTL as a byte data stream. Thus the write request sent to the PTL may consist of a mix of small data blocks and back references to data blocks either in this request or in some prior request sent to the PTL (steps 360 and 380).

Still with reference to FIG. 3, in the embodiment described in reference to FIG. 1B, which utilizes VTL 170 to perform de-duplication and to stream backup data set to the PTL, de-duplication module 290 at the VTL 200 identifies anchor points using one of the techniques described above (step 320). Once anchors have been identified, de-duplication module 290 generates a fingerprint of data blocks between identified anchors (step 330). In one implementation, a fingerprint can be generated using a Rabin-Karp hash function. Those skilled in the art would understand that other techniques for generating a fingerprint of a data block can be chosen. De-duplication module 290 determines (step 340) whether any block with the generated fingerprint has previously been stored at PTL 170 by, for example, examining the contents of the fingerprint data structure 280. If a fingerprint of the data block is not found in the fingerprint data structure (and thus in effect indicating that the data block has not been previously stored on tape), the fingerprint data structure is updated (step 370) with the fingerprint and the data block will be stored at the PTL.

If a fingerprint of the data block is found in the fingerprint data structure (which in effect indicates that the data block has previously been stored on tape), a back reference to the data block will be written to the tape, instead of the data block (step 360). The resulting data set is written to PTL as a single data stream. Thus, the write sent to the PTL may consist of a mix of small data blocks and back references to data blocks either in this request or in some prior request sent to the PTL (steps 360 and 380). VTL module 260 sends a command(s) to PTL 170 to store the data block along with a header indicating that it is a data block (step 380). VTL module 260 communicates with PTL by, for example, sending low-level commands, such as Small Computer Systems Interface (SCSI) commands or Fibre Channel (FC) network commands.

Thus, in either embodiment described herein, a single instance of a data block is stored on tape media, thereby improving space consumption on the tape media.

B. Read Operation

Figure 4:
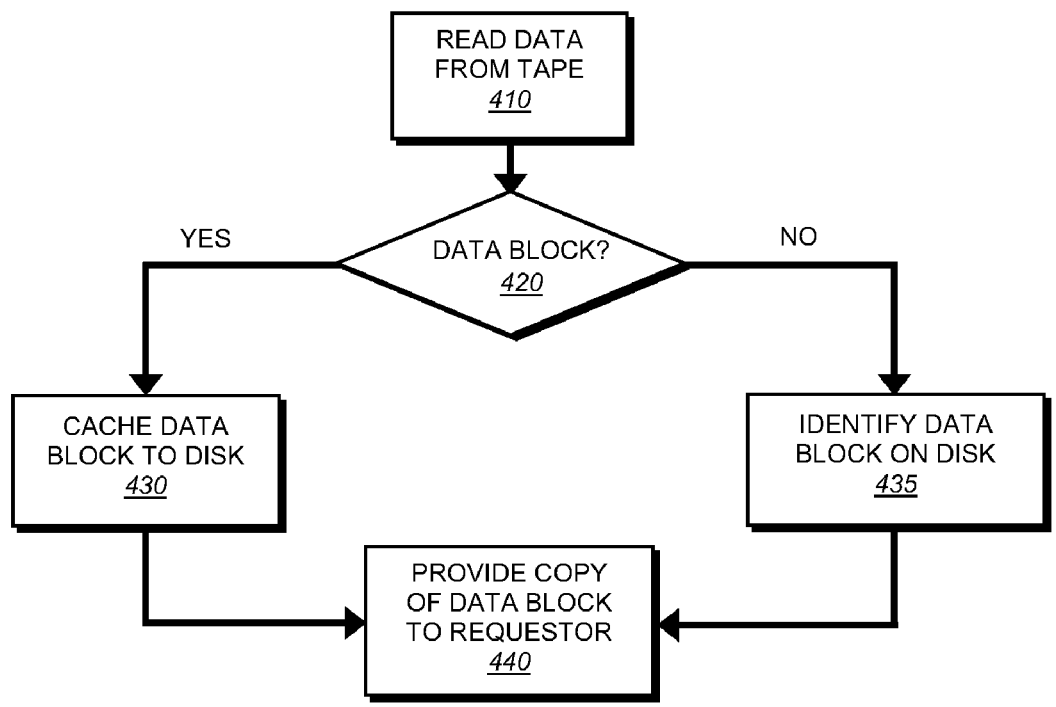
FIG. 4 is a flow diagram showing the steps to read de-duplicated data from tape media according to one embodiment of the present invention.

Referring now to FIG. 4, it illustrates steps to read de-duplicated data from PTL 170 according to embodiments of the present invention. Initially, client system 110, which executes a backup application 115, issues a request to storage system 125 or VTL 200 to read data. The read request is forwarded to PTL system 200 by storage system 125 (step 410). Storage system 125 parses data received from PTL. The data may consist of multiple data blocks and back references. De-duplication module 290 at VTL 200 or storage system 125 parses the received data to identify data blocks and references to data blocks (step 420). If a block read is actually a data block in contrast to being a reference (as, for example, indicated in a header of a data block), the data block is cached to a disk 130 connected to storage system 125 or VTL 200 (step 430). According to one implementation, as the data blocks are read, de-duplication module 290 populates a block store 285 (shown in FIG. 1 and in more detail in FIG. 5) that is utilized to cache data blocks read from the tape media to disk 130. Thus, block store 285 can be used as a staging area where data are temporarily stored when read from the physical tape. In addition, the block store 285 is a place where data is re-duplicated (e.g., data blocks referenced by back references are found prior to being provided to a requestor, such as a client). Furthermore, the block store 285 is used to store data read by the server even prior to receiving a request from the backup application. The block store 285 is implemented such that when reading data from tape and encountering a back-reference, it is possible to quickly find, in the block store 285, data blocks referenced by the back reference.

Figure 5:
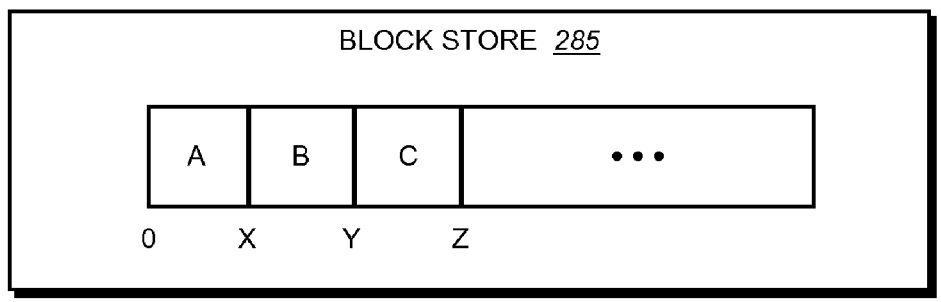
FIG. 5 is a block diagram of a data block store for storing data blocks on disks.

Referring now to FIG. 5, the block store 285 stores a plurality of blocks including, for example blocks A, B, and C that may be of the same and/or variable length in accordance with illustrative embodiments of the present invention. Furthermore, it should be understood that additional blocks may be included within block store 285. As such, the description of block store 285 containing three blocks should be taken as exemplary only. Illustratively the block store 285 is embodied as a single large file that effectively is the byte stream represented by the tape. Alternatively the block store 285 can be implemented as a directory containing a plurality of small files, possibly with each file representing a single tape block.

Illustratively, block A is stored beginning at location 0 of the block store 285 and continues to location X where block B begins. Similarly, block B ends at offset Y within the block store, which is the starting point of block C. Block C ends at location Z. The blocks A, B, and C are illustratively shown as being contiguous within block store 285. Since the data blocks in the block store are cached at the same offsets as they were stored on tape, data blocks A, B, and C are cached in the block store 285 at the same respective offsets X, Y, Z. After a data block is cached to disk 130, a copy of the data block is provided to a requestor (step 440), such as backup application 115 executed at the client 110.

Still referring to FIG. 4, if a read block is a back reference to a data block (as indicated, for example, by a header), de-duplication module 290 of storage system 125 (or VTL 200) finds in block store 285 a data block referenced by the back reference (step 435). For example, de-duplication module 290 performs a re-duplication by finding in the block store 285 a data block stored at the offset and having the length indicated in the back reference. Advantageously, the block store 285 does not store mappings between a back reference and data to be replaced, thereby providing efficient space consumption on disk. De-duplication module 290 then creates a copy of the data block and provides requested data blocks (such as files) to the requestor (step 440). When all data are read from a tape, the block store 285 can be deleted. Those skilled in the art would understand that various policies can be used to delete data from the block store 285. In one implementation, a retention policy may provide that data can be deleted based on a number of recent accesses by client system. In another implementation, data can be deleted after being stored for a predetermined time interval. Regardless of the policy implemented, the present invention aims not only at reducing space consumption on the tape media, but it also provides efficient space usage on disks connected to the storage system 125 or VTL system 200.

Those skilled in the art would understand that data blocks can be read in parallel from more than one tape. As such, de-duplication of data can be performed across two or more tapes at the PTL 170. When a reference to stored data blocks is encountered, instead of searching the referenced data on the tape (which can be stored at a distant location on the tape and thus might take long time to locate), the referenced data blocks are found on the storage device having faster seek time. As a result, the backup data are provided to the client in a timely fashion.

As a further performance improvement, storage system 125 could implement a read-ahead algorithm so that it would read the first few blocks from tape in anticipation of the client request. This would allow data reconstruction to be performed ahead of time, thereby saving computational resources. Sequential nature of the tape media (such that data are accessed in a predetermined, ordered sequence) makes it easier to implement a read ahead mechanism in the context of this invention.

Thus, when data are restored from the tape and provided to the requestor, back-referenced data are provided from a storage device having a fast seek time (such as a disk), rather than being searched on a tape. Given the sequential access properties of the tape and slow seek time, the back referenced data may not be available in a timely fashion if it is stored at a distant location on the tape. Since the data referenced by a back reference can be found on a storage device having a seek time faster than that of the tape media, the process of restoring data can be performed without the time consuming process of rewinding the tape to find data on the tape. As a result, data restoration becomes transparent to the requestor of data and the time spent on recovery of data can be reduced.

C. Alternative Embodiment of Performing De-Duplication of Data

According to yet another embodiment of the present invention, when backup data set is received by VTL 200 or storage system 125 from client 110, data are cached to storage devices connected to VTL or storage system (e.g., disks) prior to being written to tape media. De-duplication module 290 implements a technique for searching multiple redundant blocks in the backup data set so that a reference to multiple redundant data blocks can be stored on the tape. This, in turn, reduces amount of data stored on the tape media.

Figure 7:
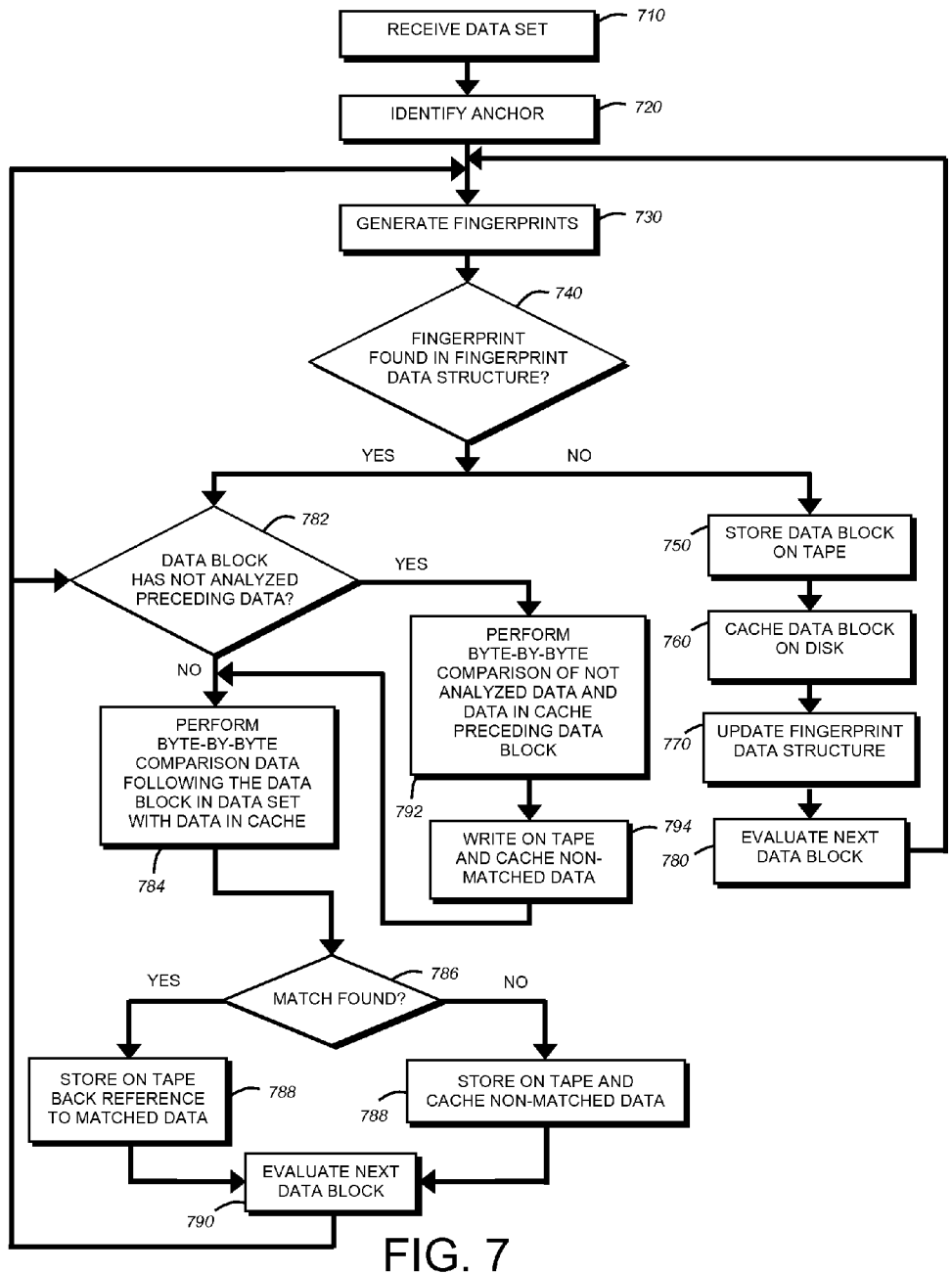
FIG. 7 is a flow diagram of a method for performing de-duplication of data prior to writing data to tape media according to an alternative embodiment of the present invention.

Referring now to FIG. 7, it illustrates the steps performed by storage system 125 or VTL system to perform de-duplication of data received from client 110 prior to writing data to tape media according to this embodiment of the present invention.

At step 710, a new back up data set is received by VTL 200 or storage system 125, from client 110, for storage at PTL 170. Data set is stored in memory 224 of VTL or storage system 125. De-duplication module 290 of storage system 125 identifies one or more anchors within the received data set (step 720) using various techniques described above. As a result, the data set is broken into some number of smaller (such as 4 KB) blocks on which de-duplication can be performed. Once anchors have been identified, de-duplication module 290 generates a fingerprint of data blocks between identified anchors (step 730). In one implementation, a fingerprint can be generated using a Rabin-Karp hash function or using any other deterministic technique to generate a value. A fingerprint may comprise a hash value of the data block.

After a fingerprint of a data block has been computed, de-duplication module 290 determines (at step 740) whether a data block having the same fingerprint has been previously stored on tape. To this end, in one implementation, de-duplication module 290 examines the contents of a fingerprint data structure 280, such as the one shown in FIG. 6.

Figure 8:
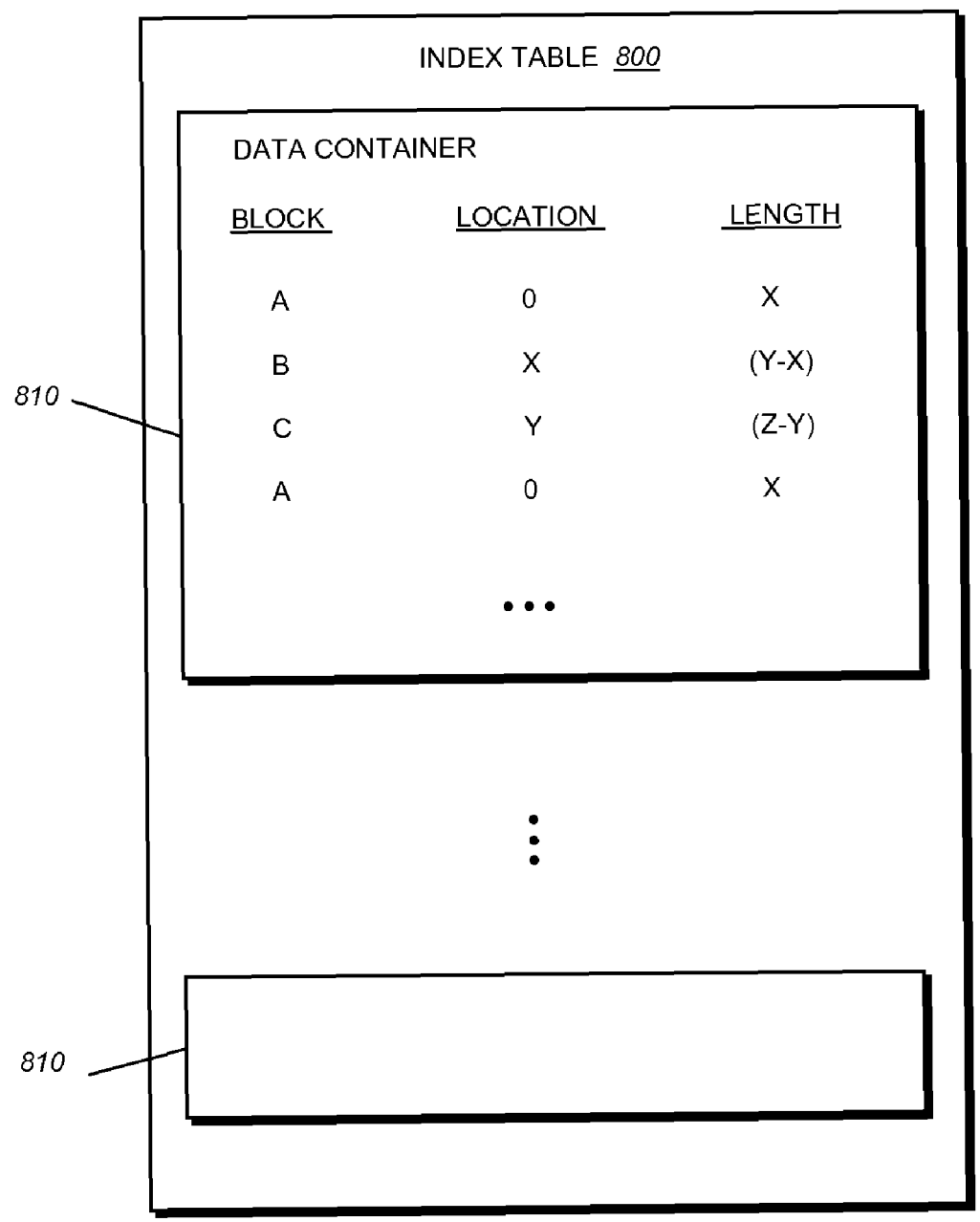
FIG. 8 is a block diagram of an index file stored on storage devices to maintain information about data blocks cached on the storage devices.

If a fingerprint of the data block is not found in the fingerprint data structure, it indicates that the data block has not been previously stored on a tape. The fingerprint data structure 280 is then updated with the fingerprint (step 770). De-duplication module 290 sends a command to PTL 170 to store the data block along with a header indicating that it is a data block (step 750). The data block is also cached on disk (step 760). Then a next data block in the backup data set is evaluated (step 780). Furthermore, an index table (such as table 800 shown in FIG. 8, which maintains state of a cache on disk) is updated to indicate that a data block is cached. The index table 800 may include a plurality of entries 810, each entry is associated with a particular data container (such as a file) cached on disk. The data container associated with exemplary entry 810 comprises four blocks, i.e., blocks "ABCA." Entry 810 comprises one or more rows, each row identifying an order of the blocks, starting locations of the blocks and length of the blocks.

Still with reference to FIG. 7, if a fingerprint of the data block is found in the fingerprint data structure, it indicates that the data block has previously been stored on a tape. If the data block does not have preceding data blocks, de-duplication module 280 performs a byte-by-byte comparison of the data blocks following the one being analyzed in the data set and data blocks in the cache (step 784). If a match is found between data following the data block in the data set and data following the data block in the cache (step 788), in one implementation, a back reference to the matching data blocks is stored on the tape rather than data blocks themselves. Appreciably, a back reference is of a smaller size than the data block it references. In one implementation, a back reference can be a combination of a length of a data block (or a plurality of data blocks) and the offset on the tape. Those skilled in the art would understand that a back reference can be created using other techniques. De-duplication module 290 sends a command to PTL 170 to store the back reference and a header indicating that the stored data is a back reference.

Thus, this embodiment advantageously provides for identifying multiple duplicate data blocks and storing a reference to the multiple duplicate data blocks on the tape media (rather than to a single data block), thereby improving storage consumption on the tape media.

Still with reference to FIG. 7, a next data block in the backup data set is evaluated (step 790). If, however, no matching data blocks are found in the cache, the non-matching data blocks in the back up data set are written to the tape and cached on disk (step 788).

If in step 782, a data block has preceding data in the data set, a byte-by-byte comparison is performed on non-matched data in the data set and data in the cache (step 792). At step 794, non-matched data are written to the tape and cached on disk. The method then continues with step 784 until all data blocks are analyzed.

The above-described algorithm can be better understood in the context of the following example. For example, the following data set is received by VTL 200 or storage system 125 as a backup data set to be written to PTL 170: "ABCAB'CD." Where B' is a B block modified in some way. For example, B, in turn can include "B1B2B3B4" and B' could be "B1B2B3'B4." Referring now to FIG. 9, it illustrates table 900 having rows and columns. The first row shows data blocks in the incoming backup data set. The second row shows data blocks that are cached on disk as a result of application of the above-described algorithm. The third row illustrates matching data blocks between the incoming backup data sets and the cached data blocks. The fourth row illustrates data stored on tape media. Each column in table 900 represents a state of processing on per data block level and thus illustrates whether a particular data block is cached to the disk and stored to the tape and whether it is a matching data block.

De-duplication module 290 identifies anchors in the data set (step 720) to essentially parse the data set into smaller chunks of data blocks. De-duplication module 290 then computes fingerprint of the data blocks (step 730). The first data block to analyze is "A". If the fingerprint of A is not found in the fingerprint data structure (step 740), "A" is considered to be a new data block (that is not previously stored on the tape). As a result, "A" is stored on tape (step 750), cached on disk (step 760), and added to the index table 800. The fingerprint data structure is updated with the fingerprint of "A" (step 770).

Figure 9:
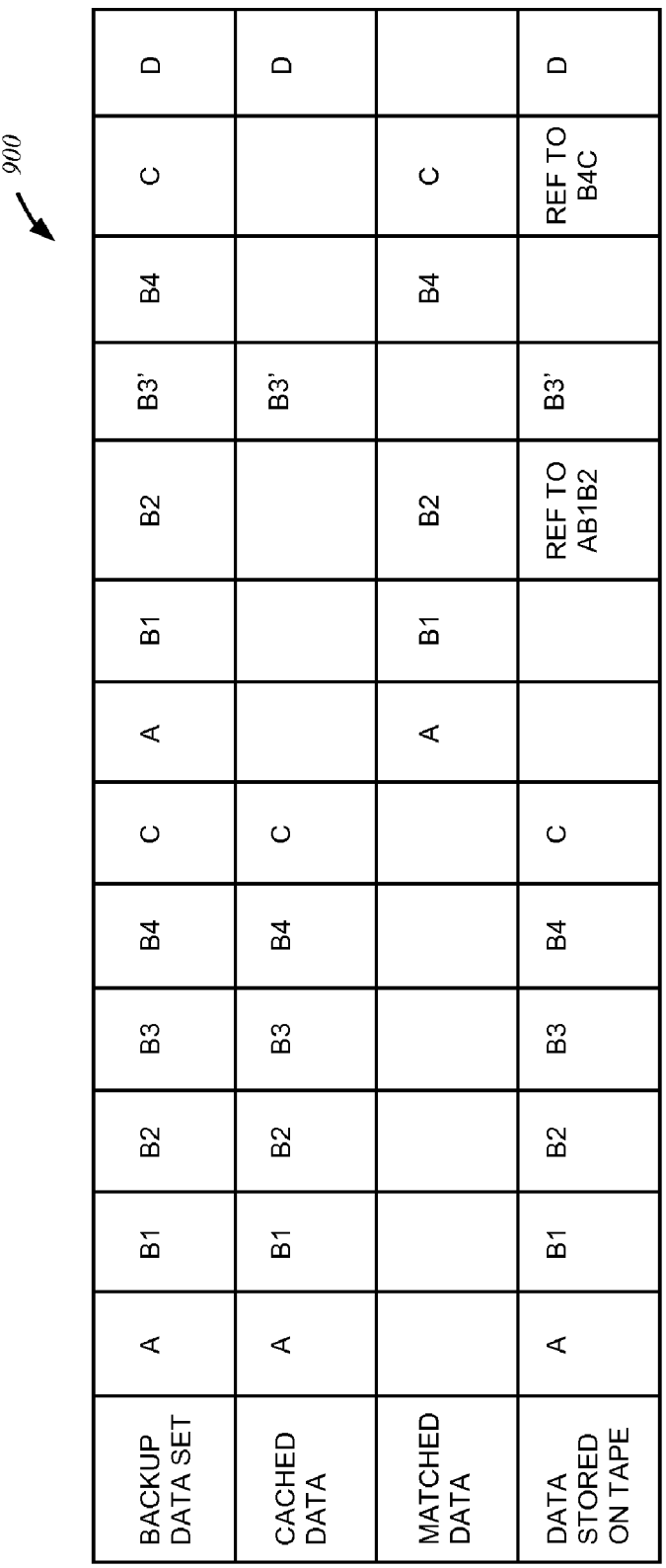
FIG. 9 is a diagram showing exemplary data stored on tape media and on disk according to the alternative embodiment of the present invention.

Next, fingerprint of "B" is analyzed (step 780). In FIG. 9, data block "B" is represented by B1B2B3B4. Fingerprint of B is similarly not found in the fingerprint data structure. As such, B is considered to be a new data block not previously stored on tape. B1B2B3B4, which represent B, are stored on tape, cached on disk, and added to the index table 800. Thus, currently AB1B2B3B4 are cached on disk. The fingerprint data structure is updated with the fingerprint of B.

Next, fingerprint of "C" is analyzed. Fingerprint of C is similarly not found in the fingerprint data structure. As such, C is considered to be a new data block not previously stored on tape. C is stored on tape, cached on disk, and is added to the index table 800. Thus, currently AB1B2B3B4C are cached on disk. The fingerprint data structure is updated with the fingerprint of C. The tape now stores AB1B2B3B4C.

Next, fingerprint of "A" is analyzed (it follows C in the backup data set). Fingerprint of A is found in the fingerprint data structure (this indicates that A has been stored on the tape). Since A is a first data block cached to disk and does not have preceding data, a byte-by-byte comparison is performed between data following A and data following A in the cache (step 784). Thus, B', which follows A in the data set, is compared with "BC" that follows A in cache. As a reminder, B includes "B1B2B3B4" and B' includes "B1B2B3'B4."

As a result of the byte-by-byte comparison between B'=B1B2B3'B4 and data following A in the cache (i.e., B1B2B3B4C), the following data blocks match: "AB1B2" (as shown in table 900). B3' is not matched. According to the algorithm described in reference to FIG. 7, a reference to the matched data is stored on tape (step 788) (as shown in table 900). The reference includes a length of the matched data and its offset on the tape. Thus, the tape now stores AB1B2B3C [AB1B2], where bracketed items represent references to data instead of the data itself.

Next, fingerprint of "C" is analyzed since C is the next data block in the data set. Fingerprint of C is found in the fingerprint data structure (this indicants that C has been stored on the tape) (step 740). Then, a determination is made whether C has preceding data in the data set (step 782) that has not been analyzed. C has preceding data that has not been analyzed—B4, which is byte-by-byte compared with data preceding C in the block store (step 792). Thus, B4 is compared to "AB1B2B3'B4". B4 is the matching data. Data preceding B4 that does not match (i.e., B3') is written to the tape and cached on disk (step 794). Now the cached data are ABCAB1B2B3' (as shown in FIG. 9). The tape now stores AB1B2B3B4C [AB1B2]B3', where bracketed items represent references to the data in the brackets instead of the data itself.

Data following C in the data set (which is D) is byte-by-byte compared with data in the cache following C. No match is found since D has not been encountered before. Thus, a reference to the matched data "B4C" is stored to the tape.

As a result, the tape now stores: AB1B2B3B4C [AB1B2] B3' [B4C] D (as shown in table 900); wherein bracketed items represent back references to data instead of the data itself.

Thus, as demonstrated by the above-described example, searching for large duplicate blocks increases storage compression on the tape media since instead of storing the large duplicate blocks only a reference to those blocks (which appreciably has a smaller size) are written to the tape media.

Referring again to FIG. 4, it illustrates steps to read data from PTL 170 that was written to the tape according to the algorithm described in reference to FIG. 7. Initially, client system 110, which executes a backup application 115, issues a request to read data to storage system 125 or VTL 200. The read request is forwarded to PTL system 200 by storage system 125 (step 410). Storage system 125 parses data received from PTL. The data may consist of multiple data blocks and back references. De-duplication module 290 determines whether the read block is a data block or a reference to a data block (step 420). If read data is a data block as opposed to a reference to a data block (as, for example, indicated in header of a data block), the block store 285 is populated with the data block. As described herein, the block store 285 is implemented on disks connected to storage system 125 or to VTL 200 (step 430). The block store 285 can represent an image of a tape so that when a data block is cached at the block store 285, it is located at the same offset as it was stored on the tape.

If a read block represents a back reference to one or more data blocks previously stored on tape (as indicated, for example, in a header of the block), de-duplication module 290 of storage system 125 (or VTL 200) finds in the block store 285 the data blocks referenced by the back reference (step 435). For example, de-duplication module 290 finds in the block store data blocks stored at the offset and having the length indicated in the back reference. Advantageously, the block store 285 does not store mappings between a back reference and data to be replaced, thereby providing efficient space consumption on disk. De-duplication module 290 then creates a copy of the data block and provides requested data blocks (such as files) to the requestor (step 440). When all data are read from a tape, the block store 285 can be deleted. As described earlier, various policies can be used to delete data from the block store 285. In one implementation, a retention policy may provide that data can be deleted based on a number of recent accesses by the client system. In another implementation, data can be deleted after being stored for a predetermined time interval.

Furthermore, those skilled in the art would understand that data blocks can be read in parallel from more than one tape. As such, de-duplication of data can be performed across the tapes at the PTL 170.

Thus, when data are restored from the tape and provided to the requestor, back-referenced data are provided from a storage device having a fast seek time (such as a disk), rather than being searched on a tape, which would have to be re-wound. Given the sequential access properties of the tape and slow seek time, the back referenced data may not be available in a timely fashion if it is stored at a distant location on the tape. Since the data referenced by a back reference can be found on a storage device having a seek time faster than that of the tape media, the process of restoring data can be performed without the time consuming process of rewinding the tape to find data on the tape. As a result, data restoration becomes transparent to the requestor of data and the time spent on recovery of data can be reduced.

The foregoing description has been directed to particular embodiments of this invention. It will be apparent, however, that other variations and modifications may be made to the described embodiments, with the attainment of some or all of their advantages. For example, according to embodiments of the present invention, during a write operation, if a data block has already been written to a tape at the offset that is located far (i.e., more than several blocks) from the current offset, the data block itself is written rather than its back reference. This is important for efficiency reasons. For example, if the data are read from the middle of a tape and it back-referenced data stored at the beginning of the tape, it would take considerable amount of time to restore data from the middle of the tape.

Furthermore, in one implementation, a fingerprint data structure can be stored at the end of the tape after each backup data set. Since a fingerprint data structure (which may be implemented as a hash table) can grow large in size as new data are written to a tape (s), offloading the data structure from the memory of the storage system or VTL may improve storage consumption. When the client next wants to append to that tape, the fingerprint data structure would be read back into memory. The space occupied by the fingerprint data structure would then be overwritten with the new data sent by client and an updated fingerprint data structure would be appended once this job was done. For example, the following progression may take place:

1) Client writes initial data set to tape;
Tape Contents—[Data Set 1]
2) Storage System saves fingerprint data structure on tape;
Tape Contents—[Data Set 1][fingerprint data structure]
3) Client writes second data set to tape. Before new data is written, storage system reads fingerprint data structure and positions tape head so client data overwrites the data structure.
Tape Contents—[Data Set 1][Data Set 2]
4) Storage System saves updated fingerprint data structure, e.g., in memory.
Tape Contents—[Data Set 1][Data Set 2][fingerprint data structure]
5) Steps 3 and 4 are repeated with each new data set until the tape is full.

Furthermore, prior to storing a new backup data set to the same tape at a later time, the fingerprint data structure can be consulted to determine whether a new data block to be written to the tape is already stored on the tape as to avoid storing duplicate data blocks.

Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

What is claimed is:

1. A method for reducing storage of duplicate data on a sequential access media operatively connected to a storage system having a processor and a memory, comprising:
   receiving data at the storage system to be stored on the sequential access media;
   determining that the data is already stored at a first location on the sequential access media;

storing to a second location on the sequential access media a reference that points to the data at the first location in response to determining the data is already stored at the first location;

receiving at the storage system a data request from a requestor; and determining whether the data request is directed to the first location or whether the data request is directed to the second location, in response to determining the data request is directed to the first location, caching the requested data at a third location to a second non-sequential storage device logically corresponding to the first location, in response to determining the data request is directed to the second location:

determining whether the requested data at the first location has been cached at the third location, in response to determining that the requested data has been cached at the third location, providing the requested data from the third location to the requestor, in response to determining that the requested data has not been cached at the third location, caching the requested data at the third location, and providing the requested data to the requestor from the third location.

2. The method of claim 1, further comprising:

generating a fingerprint for the data; and examining a data structure storing the fingerprint of the data stored on the sequential media to determine that the data is already stored on the sequential access media at the first location.

3. The method of claim 2, wherein generating the fingerprint comprises applying a hash function on the data.

4. The method of claim 2, further comprising updating the data structure with a newly generated fingerprint in response to determining that a second data block of the data is not already stored on the sequential access media.

5. The method of claim 2, further comprising storing the data structure on the second storage device.

6. The method of claim 2, wherein the data structure is stored on the sequential access media at an end of a data set of the data.

7. The method of claim 1, wherein the reference comprises a length and an offset of the data stored on the sequential access media.

8. The method of claim 1, further comprising:

locating the data on the second storage device without rewinding the sequential access media, wherein the second storage device has a faster seek time than the sequential access media.

9. The method of claim 1, wherein the reference has a smaller size than the data.

10. The method of claim 1, further comprising:

determining whether a second reference that points to the data at the first location is to be stored on the sequential access media at an offset greater than a predetermined number of blocks; and in response to a positive determination regarding the second reference, writing the data to the offset instead of writing the second reference.

11. The method of claim 1, further comprising reading the data from the sequential access media prior to receiving the data request and temporarily storing the data at the second storage device.

12. A storage system to reduce storage of duplicate data on a sequential access media, comprising:

means for receiving data at the storage system, having a processor and a memory, to be stored on the sequential access media;

means for determining that the data is already stored at a first location on the sequential access media;

means for storing to a second location on the sequential access media a reference that points to the data at the first location;

means for receiving at the storage system a data request from a requestor;

means for determining whether the data request is directed to the first location or whether the data request is directed to the second location;

means for caching the requested data at a third location to a second non-sequential storage device logically corresponding to the first location;

means for determining whether the requested data at the first location has been is cached at the third location; and means for providing the requested data from the third location to the requestor.

13. The system of claim 12, wherein the means for determining comprises:

means for generating a fingerprint of the data;

means for examining a fingerprint data structure maintaining the fingerprint; and means for determining whether a matching fingerprint of the data is found in the fingerprint data structure.

14. The system of claim 13, further comprising means for sending a command to the storage system to store the data on the sequential access media in response to a determination that the matching fingerprint is not found.

15. The system of claim 12, further comprising:

means for determining whether a second reference that points to the data at the first location is to be stored on the sequential access media at an offset greater than a predetermined number; and means for writing the data to the offset instead of writing the second reference.

16. A computer-readable storage medium containing executable program instructions for execution by a processor, the computer readable medium comprising:

program instructions that receive data at a storage system to be stored on a sequential access media;

program instructions that determine that the data is already stored at a first location on the sequential access media;

program instructions that store to a second location on the sequential access media a reference that points to the data at the first location;

program instructions that receive at the storage system a data request from a requestor;

program instructions that determine whether the data request is directed to the first location or whether the data request is directed to the second location;

program instructions that cache the requested data at a third location to a second non-sequential storage device logically corresponding to the first location;

program instructions that determine whether the requested data at the first location has been cached at the third location; and program instructions that provide the requested data from the third location to the requestor.

17. A system for reducing an amount of data stored on sequential access media, comprising:
   a storage system having a processor configured to execute a storage operating system, the storage operating system configured to:
   receive a backup data set from a backup application;
   determine that a data block of the backup data set is stored on the sequential access media at a first location,
   store to a second location on the sequential access media a reference that points to the data block at the first location;
   receive a data request from a requestor;
   determine whether the data request is directed to the first location or whether the data request is directed to the second location;
   cache the requested data temporarily at a third location to a second non-sequential storage device logically corresponding to the first location;
   determine whether the requested data at the first location has been cached at the third location; and
   provide the requested data from the third location to the requestor without rewinding the sequential access media.

18. The system of claim 17, wherein a block store operatively connected to the storage device is absent of mappings between the reference and the data block.

19. The system of claim 17, wherein the storage operating system is further configured to create a fingerprint data structure to store one or more fingerprints of the backup data set, and wherein the fingerprint data structure is absent of mappings between the reference and the data block.

20. The system of claim 17, further comprising:
   a physical tape library (PTL) in communication with the storage system, the PTL comprising the sequential access media.

21. The system of claim 17, wherein the second storage device has a faster seek time than the sequential access media.

22. The system of claim 21, wherein the storage system comprises a virtual tape library (VTL) connected to the second storage device.

23. The system of claim 22, wherein the VTL comprises a VTL module configured to communicate with the PTL to write data to the sequential access media and to read data from the sequential access media.

24. The system of claim 17, wherein the storage system is further configured to execute a de-duplication module configured to generate a fingerprint for the data block and further configured to use the fingerprint to determine that the data block is stored on the sequential access media at the first location.

* * * * *